United States Patent
Jost et al.

(10) Patent No.: US 12,425,858 B2
(45) Date of Patent: Sep. 23, 2025

(54) INTEGRITY VERIFICATION IN A WIRELESS COMMUNICATION NETWORK

(71) Applicant: Telefonaktiebolaget LM Ericsson (publ), Stockholm (SE)

(72) Inventors: Christine Jost, Dalby (SE); Ferhat Karakoc, Istanbul (TR); Magnus Hallenstål, Täby (SE); Maria Cruz Bartolome Rodrigo, Torremocha de Jarama Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 411 days.

(21) Appl. No.: 18/022,856

(22) PCT Filed: Aug. 17, 2021

(86) PCT No.: PCT/EP2021/072805
§ 371 (c)(1),
(2) Date: Feb. 23, 2023

(87) PCT Pub. No.: WO2022/043130
PCT Pub. Date: Mar. 3, 2022

(65) Prior Publication Data
US 2023/0319571 A1 Oct. 5, 2023

Related U.S. Application Data

(60) Provisional application No. 63/069,184, filed on Aug. 24, 2020.

(51) Int. Cl.
*H04L 9/00* (2022.01)
*H04W 12/06* (2021.01)
*H04W 12/106* (2021.01)

(52) U.S. Cl.
CPC ....... *H04W 12/106* (2021.01); *H04W 12/068* (2021.01)

(58) Field of Classification Search
CPC ... H04L 63/0464; H04L 12/08; H04L 61/251; H04L 45/20; H04L 47/32; H04L 47/76;
(Continued)

(56) References Cited

U.S. PATENT DOCUMENTS

| | | |
|---|---|---|
| 11,570,689 B2 | 1/2023 | Rajput et al. |
| 11,695,563 B2 | 7/2023 | Rajput et al. |

(Continued)

FOREIGN PATENT DOCUMENTS

WO 2020053481 A1 3/2020

OTHER PUBLICATIONS

3GPP, "3GPP TR 33.875 V0.2.0", 3rd Generation Partnership Project; Technical Specification Group Services and System Aspects; Study on enhanced security aspects of the 5G Service Based Architecture (SBA); (Release 17), Mar. 2021, 1-20.

(Continued)

*Primary Examiner* — Phuoc H Doan
(74) *Attorney, Agent, or Firm* — Murphy, Bilak & Homiller, PLLC

(57) ABSTRACT

Network equipment implements a network function in a wireless communication network. The network equipment obtains integrity verification information that is a function of only a portion of a message. The message is either a request for a service to be consumed by the network function or a response to a request for a service provided by the network function. The network equipment digitally signs an assertion that includes the integrity verification information, and then sends the message and the digitally signed assertion to a service communication proxy. Other network equipment that receives the message and the digitally signed assertion (Continued)

may check an integrity of the portion of the message, based on integrity verification information that the other network equipment obtains and on the integrity verification information included in the digitally signed assertion.

20 Claims, 8 Drawing Sheets

(58) Field of Classification Search
CPC ....... H04L 45/02; H04L 24/02; H04L 45/126; G06F 21/602; H04W 12/106; H04W 12/068
See application file for complete search history.

(56) References Cited

U.S. PATENT DOCUMENTS

| | | | |
|---|---|---|---|
| 2016/0219024 A1* | 7/2016 | Verzun | H04L 9/34 |
| 2019/0251241 A1 | 8/2019 | Bykampadi et al. | |
| 2020/0244582 A1* | 7/2020 | Li | H04L 45/02 |

OTHER PUBLICATIONS

3GPP, "3GPP TS 23.501 V16.5.1", 3rd Generation Partnership Project; Technical Specification Group Services and System Aspects; System architecture for the 5G System (5GS); Stage 2 (Release 16), Aug. 2020, 1-440.

3Gpp, "3GPP TS 29.500 V17.2.0", 3rd Generation Partnership Project; Technical Specification Group Core Network and Terminals; 5G System; Technical Realization of Service Based Architecture; Stage 3 (Release 17), Mar. 2021, 1-100.

3GPP, "3GPP TS 33.220 V17.1.0", 3rd Generation Partnership Project; Technical Specification Group Services and System Aspects; Generic Authentication Architecture (GAA); Generic Bootstrapping Architecture (GBA) (Release 17), Jun. 2021, 1-95.

3GPP, "3GPP TS 33.501 V16.3.0", 3rd Generation Partnership Project; Technical Specification Group Services and System Aspects; Security architecture and procedures for 5G system (Release 16), Jul. 2020, 1-248.

3GPP, "3GPP TS 33.501 V17.1.0", 3rd Generation Partnership Project; Technical Specification Group Services and System Aspects; Security architecture and procedures for 5G system (Release 17), Mar. 2021, 1-256.

Berners-Lee, T., et al., "Uniform Resource Identifier (URI): Generic Syntax", Network Working Group, Request for Comments: 3986, Jan. 2005, 1-61.

Ericsson, "Assertions: partial protection of the message", 3GPP TSG-SA3 Meeting #101-e, S3-203149, e-meeting, Nov. 9-20, 2020, 1-3.

Ericsson, "New Solution to KI#5: End-to-end integrity protection of HTTP body and method", 3GPP TSG-SA3 Meeting #102Bis-e, S3-211047, (Revision of S3-20xxxx), e-meeting, Mar. 1-5, 2021, 1-3.

Ericsson, "Update Solution #5: End-to-end integrity protection of HTTP body and method", 3GPP TSG-SA3 Meeting #104-e, S3-212764, e-meeting, May 16-27, 2021, 1-5.

Jones, M., et al., "JSON Web Signature (JWS)", Internet Engineering Task Force (IETF), Request for Comments: 7515, Category: Standards Track, May 2015, 1-59.

Jones, M., et al., "JSON Web Token (JWT)", Internet Engineering Task Force (IETF), Request for Comments: 7519, Category: Standards Track, ISSN: 2070-1721, May 2015, pp. 1-20.

Nokia, et al., "Integrity protection of service request in indirect communication", 3GPP TSG-SA3 Meeting #100e, S3-201801, e-meeting, Aug. 17-28, 2020, 1-4.

Nokia, "New SID on eSBA security", 3GPP TSG-SA3 Meeting #100e, S-210793, (revision of S3-yyxxxx), e-meeting, Aug. 17-28, 2020, 1-3.

* cited by examiner

INTEGRITY VERIFICATION IN A WIRELESS COMMUNICATION NETWORK

TECHNICAL FIELD

The present application relates generally to a wireless communication network, and relates more particularly to integrity verification in such a network.

BACKGROUND

In a wireless communication network with a service-based architecture, a consumer network function consumes a service provided by a producer network function. If the consumer network function communicates directly with the producer network function, communications between them can be integrity and/or confidentiality protected based on, for instance, transport layer security protocols such as Transport Layer Security (TLS).

Interposing a service communication proxy (SCP) between the consumer network function and the producer network function provides a number of benefits, such as signaling aggregation and routing, load balancing, overload handling, message parameter harmonization, etc. But the SCP's presence makes the communication between consumer and producer network functions indirect, meaning that the communication cannot be protected in the same way as if the communication were direct, e.g., using TLS. Challenges exist therefore in exploiting a service communication proxy in a wireless communication network while also protecting communications between consumer and producer network functions.

SUMMARY

Embodiments herein integrity protect a portion (e.g., body) of a message that is exchanged between consumer and producer network functions via a service communication proxy in a wireless communication network. Some embodiments, for example, include a hash of that portion of the message in a digitally signed assertion that accompanies the message, for use in verifying the integrity of the message. Integrity protecting a portion of the message, as opposed to integrity protecting the message in its entirety, advantageously allows the service communication proxy to modify the unprotected portion (e.g., header(s)) as needed to provide one or more proxy functions, e.g., path modification as part of message routing.

More particularly, embodiments herein include a method performed by network equipment that implements a network function in a wireless communication network. The method comprises obtaining integrity verification information that is a function of only a portion of a message. The message is either a request for a service to be consumed by the network function or a response to a request for a service provided by the network function. The method further comprises digitally signing an assertion that includes the integrity verification information. The method may then include sending the message and the digitally signed assertion to a service communication proxy.

In some embodiments, for example, the integrity verification information is a hash of the portion of the message.

In some embodiments, the message includes one or more headers and a body, and the portion of the message is the body (e.g., a JSON body).

In some embodiments, the message includes a path pseudo-header that identifies a target of the message, and the portion of the message excludes the path pseudo-header. Alternatively or additionally, the message may include a Uniform Resource Identifier, URI, that identifies a resource as a target of the message, and the portion of the message may exclude the URI.

In some embodiments, the assertion is a JavaScript Object Notation, JSON, Web Token, and digitally signing the assertion is based on a JSON Web Signature.

In some embodiments, the assertion is a client credentials assertion that further includes at least one of any one or more of: an instance ID of the network function; a timestamp indicating a time at which the assertion is generated; a time at which the assertion expires; and a network function type of an expected audience of the assertion.

In some embodiments, sending the message and the digitally signed assertion comprises sending the message and the digitally signed assertion to the service communication proxy over a secured transport layer tunnel (e.g., TLS tunnel) between the network equipment and the service communication proxy.

In some embodiments, the digitally signed assertion is included in a header of the message.

In some embodiments, the message is an application layer message.

Embodiments herein also include another method performed by network equipment that implements a network function in a wireless communication network. The method comprises receiving a message that is either a request for a service provided by the network function or a response to a request for a service to be consumed by the network function. The method also comprises receiving a digitally signed assertion that includes integrity verification information. The method further comprises obtaining integrity verification information that is a function of only a portion of the message. The method then comprises checking an integrity of the portion of the message based on the obtained integrity verification information and the integrity verification information included in the digitally signed assertion.

In some embodiments, checking the integrity of the portion of the message comprises checking whether or not the obtained integrity verification information matches the integrity verification information included in the digitally signed assertion. In this case, method further comprises verifying the integrity of the portion of the message if the obtained integrity verification information matches the integrity verification information included in the digitally signed assertion according to said checking. In one embodiment, for example, the method further comprises selecting, from among different possible actions, an action to perform based on whether or not the integrity of the portion of the message is verified, and performing the selected action. For instance, the different possible actions may include two or more of responding to the message, sending an error message, dropping the message, or refraining from responding to the message.

In some embodiments, the obtained integrity verification information is a hash of the portion of the message.

In some embodiments, the message includes one or more headers and a body, and the portion of the message includes the body.

In some embodiments, the message includes a path pseudo-header that identifies a target of the message, and the portion of the message excludes the path pseudo-header. Alternatively or additionally, the message may include a Uniform Resource Identifier, URI, that identifies a resource as a target of the message, and the portion of the message may exclude the URI.

In some embodiments, the assertion is a JavaScript Object Notation, JSON, Web Token, and digitally signing the assertion is based on a JSON Web Signature.

In some embodiments, the assertion is a client credentials assertion that further includes at least one of any one or more of: an instance ID of the network function; a timestamp indicating a time at which the assertion is generated; a time at which the assertion expires; and a network function type of an expected audience of the assertion.

In some embodiments, receiving the message and receiving the digitally signed assertion comprises receiving the message and the digitally signed assertion from a service communication proxy.

In some embodiments, receiving the message and receiving the digitally signed assertion comprises receiving the message and the digitally signed assertion over a secured transport layer tunnel (e.g., TLS tunnel) between the network equipment and a service communication proxy.

In some embodiments, the message is an application layer message.

Embodiments herein further comprise corresponding apparatuses, computer programs, and carriers of those computer programs. For example, embodiments herein include network equipment configured to implement a network function in a wireless communication network. The network equipment is configured, e.g., via communication circuitry and processing circuitry, to obtain integrity verification information that is a function of only a portion of a message. The message is either a request for a service to be consumed by the network function or a response to a request for a service provided by the network function. The network is further configured to digitally sign an assertion that includes the integrity verification information, as well as to send the message and the digitally signed assertion to a service communication proxy.

Embodiments herein also include network equipment that implements a network function in a wireless communication network. The network equipment is configured, e.g., via communication circuitry and processing circuitry, to receive a message that is either a request for a service provided by the network function or a response to a request for a service to be consumed by the network function. The network equipment is further configured to receive a digitally signed assertion that includes integrity verification information. The network equipment is also configured to obtain integrity verification information that is a function of only a portion of the message. The network equipment is further configured to check an integrity of the portion of the message based on the obtained integrity verification information and the integrity verification information included in the digitally signed assertion.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Figure 1:
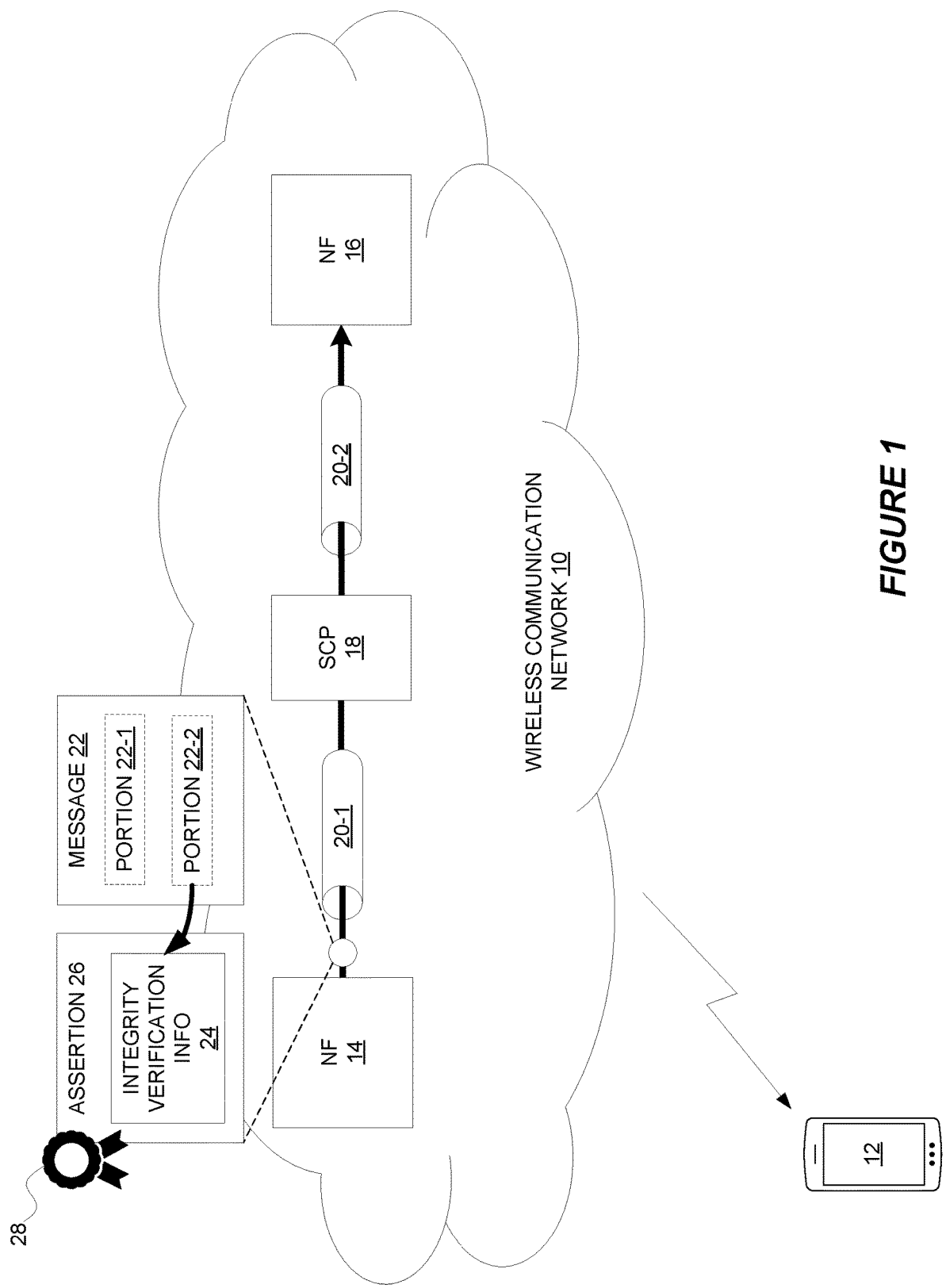
FIG. 1 is a block diagram of a wireless communication network according to some embodiments.

FIG. 1 shows a wireless communication network 10 according to some embodiments. The wireless communication network 10 provides wireless communication service to one or more wireless devices 12.

The wireless communication network 10 as shown has a service-based architecture (SBA). With such an architecture, functionality in the network 10 is delivered via a set of interconnected network functions (NFs), each with authorization to access each other's services. Exemplary NFs in a 5G network may include, for example, an Access and Mobility Function (AMF), a Session Management Function (SMF), an Authentication Server Function (AUSF), a Unified Data Management (UDM) function, or any other NF in a 5G network. Regardless, in some embodiments, NFs can register themselves (e.g., with a network repository function, NRF) and subscribe to other services. This may enable more flexible development of new services, as it becomes possible to connect to other components without introducing new interfaces dedicated to those components.

FIG. 1 shows two NFs 14, 16 that indirectly communicate with one another via a service communication proxy (SCP) 18. The SCP 18 may perform one or more proxy functions in this role, such as communication routing, which may require the SCP 18 to perform modifications to the communication.

The indirect nature of the NF communication may mean that there is no direct connection or tunnel between the NFs 14, 16. For example, rather than there being a secured transport layer tunnel (e.g., a Transport Layer Security, TLS, tunnel) directly between the NFs 14, 16, there may instead be one secured transport layer tunnel 20-1 between NF 14 and the SCP 18 and a separate secured transport layer tunnel 20-2 between the SCP 18 and NF 16. The indirect nature of the communication between the NFs 14, 16 in these and other circumstances may therefore mean that the underlying protocol layers on which the communication is based cannot themselves provide end-to-end communication protection.

FIG. 1 for example shows that NF 14 is to send a message 22 to NF 16 via the SCP 18. The message 22 may be an application layer message, such as a HyperText Transfer Protocol (HTTP) message. Regardless, in some embodiments, such as where NF 14 is a consumer NF and NF 16 is a producer NF, the message 22 is a service request message that requests a service to be consumed by NF 14 and/or provided by NF 16. In other embodiments, such as where NF 14 is a producer NF and NF 16 is a consumer NF, the message 22 is a service response message that is a response to a request for a service to be consumed by NF 16 and/or provided by NF 14. No matter the particular type of message 22, though, the message 22 is communicated between the NFs 14, 16 via one or more SCPs, including SCP 18. Even if the message 22 is communicated over secured transport layers tunnels 20-1, 20-2, though, the protection provided by those tunnels 20-1, 20-2 themselves cannot provide end-to-end protection of the message 22.

In this context, some embodiments herein integrity protect the message 22 to at least some extent while still enabling the SCP 18 to perform one or more proxy functions that involve modifications to the message 22. In fact, in some embodiments, only a part of the message 22 is integrity protected (e.g., at the application layer), so that another part of the message 22 that is not integrity protected can be modified by the SCP 18 as needed to perform one or more proxy functions.

According to some embodiments, for example, the message 22 has a first portion 22-1 and a second portion 22-2. The first and second portions 22-1, 22-2 do not overlap. The first portion 22-1 may for example include one or more headers of the message 22, e.g., one or more actual headers or pseudo-headers. The second portion 22-2 in this example, then, may include the body of the message 22 (e.g., a JavaScript Object Notation (JSON) body) or otherwise include a part of the message 22 that conveys service operation data. No matter the particular type of the portions 22-1, 22-2, though, some embodiments may integrity protect the second portion 22-2, but avoid integrity protecting the first portion 22-1 (at least at the application layer). This way, the SCP 18 can still modify the first portion 22-1, as needed for performing one or more proxy functions, without causing verification of the message's integrity to fail at NF 16. For instance, where the first portion 22-1 includes a path pseudo-header that identifies a target of the message 22, the SCP 18 may still modify the path pseudo-header as part of performing application programming interface (API) root modification, without causing verification of the message integrity to fail at NF 16. Or, similarly, where the first portion 22-1 includes a Uniform Resource Identifier (URI) that identifies a resource as a target of the message 22, the SCP 18 may still modify the URI as part of performing API root modification, without causing verification of the message integrity to fail at NF 16. But, any undesirable modification of the message's second part 22-2 (e.g., the message's body) will still be detected due to integrity protection of that second part 22-2.

More particularly in this regard, NF 14 as shown in FIG. 1 obtains integrity verification information (info) 24. In some embodiments, integrity verification information 24 is a function of the second portion 22-2 of the message 22. For example, the integrity verification information 24 may be a hash of the second portion 22-2 of the message 22, i.e., the function is a hash function. In another example, the integrity verification information 24 may be the second portion 22-2 itself, i.e., the function is an identity function with respect to the second portion 22-2. Note here that hashing the second portion 22-2 may prove more efficient in terms of signaling overhead than including the second portion 22-2 itself. Regardless, the particular function used for obtaining the integrity verification information 24 may be predefined, standardized, or otherwise shared between the NFs 14, 16.

Having obtained the integrity verification information 24, NF 14 may digitally sign an assertion 26 (e.g., a token) that includes the integrity verification information 24. Digitally signing the assertion 26 may for instance involve applying a digital signature 28 (e.g., a cryptographic signature) to the assertion 26 using a digital certificate. In some embodiments where the assertion 26 is a JSON Web Token, the digital signature 28 may be based on a JSON Web Signature. Regardless, in some embodiments, the assertion 26 may also include an instance ID of NF 14, a timestamp indicating a time at which the assertion 26 is generated, a time at which the assertion 26 expires, and/or a network function type of an expected audience of the assertion 26. In these and other embodiments, the assertion 26 may generally provide authentication of NF 14 to NF 16, e.g., as specified by 3GPP TS 33.501 v16.3.0 section 13.3.8.

In any event, NF 14 as shown may send the message 22 and the digitally signed assertion 26 to the SCP 18, e.g., over the secured transport layer tunnel 20-1. NF 14 may do so in a way that associates the digitally signed assertion 26 with the message 22. For example, NF 14 in some embodiments sends the digitally signed assertion 26 in a header of the message 22, which may for example be included in portion 22-1 of the message 22.

The SCP 18 in some embodiments performs one or more proxy functions based on the message 22. The SCP 18 may for example perform Application Programming Interface (API) root modification, e.g., as part of routing the message 22. These or other proxy functions may involve modifying the portion 22-1 of the message 22 that is not integrity protected by the integrity verification information 24. The SCP 18 may then relay the message 22, as potentially modified, to NF 16. Although not shown, there may be one or more additional SCPs in the path between the NFs 14, 16.

NF 16 correspondingly receives the message 22 and the digitally signed assertion 26. NF 16 checks the integrity of portion 22-2 of the message 22 using the integrity verification information 24 included in the digitally signed assertion 26, e.g., after verifying the digital signature on the assertion 26. To do so, NF 16 may itself obtain integrity verification information (not shown) as a function of the second portion 22-2 of the message 22 as received. Where the function is a hash function, for instance, NF 16 may itself obtain a hash of the second portion 22-2 of the message 22 as received. Regardless, NF 16 may then check the integrity of portion 22-2 of the message 22 based on the obtained integrity verification information and the integrity verification information 24 included in the digitally signed assertion 26. For example, NF 16 may check whether or not the obtained integrity verification information matches the integrity verification information 24 included in the digitally signed assertion 26. If they match, NF 16 may deem the integrity of portion 22-2 as verified.

NF 16 in some embodiments may handle the message 22 in different ways depending on the outcome of the integrity verification check. NF 16 in this regard may select, from among different possible actions, an action to perform based on whether or not the integrity of portion 22-2 of the message 22 is verified. The different possible actions may include for instance responding to the message 22, sending an error message in return, dropping the message 22, or refraining from responding to the message 22. Regardless, NF 16 may then perform the selected action.

Figure 2A:
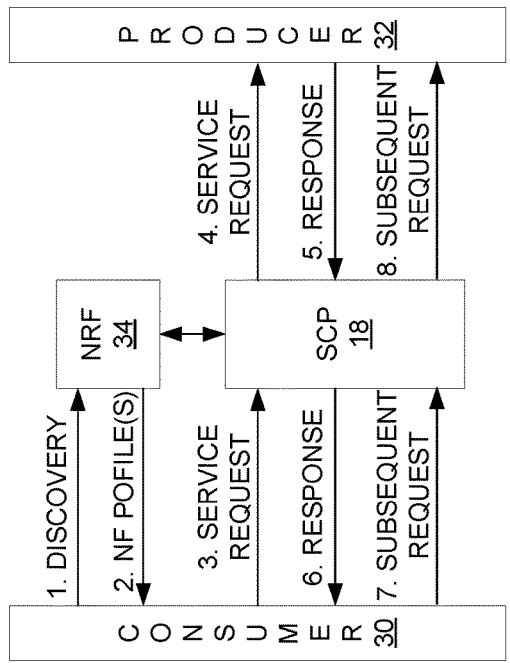
FIG. 2A is a call flow diagram for indirect communication without delegated discovery according to some embodiments.
Figure 2B:
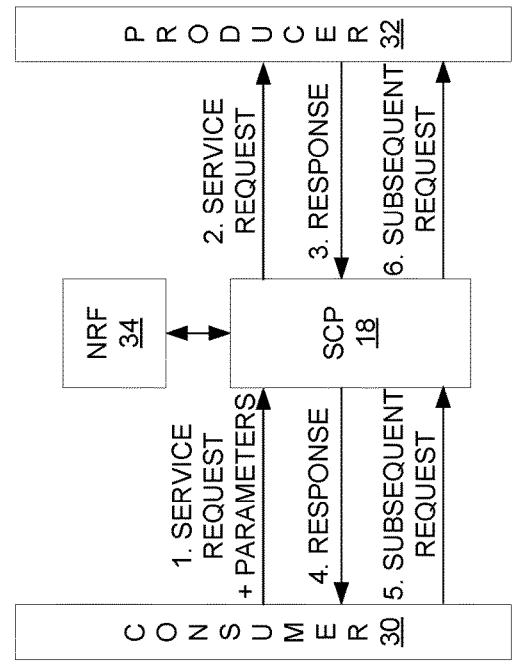
FIG. 2B is a call flow diagram for indirect communication with delegated discovery according to some embodiments.

FIGS. 2A-2B illustrate additional details of indirect communication between the NFs 14, 16 via the SCP 18 according to some embodiments. FIG. 2A shows a scenario referred to as indirect communication without delegated discovery. A consumer 30 does discovery by querying an NRF 34 (Step 1). Based on the discovery result, shown as NF profile(s) in Step 2, the consumer 30 does the selection of an NF Set or a specific NF instance of NF instance set. The consumer 30 sends a request to the SCP 18 containing the address of the selected service producer 32 pointing to a NF service instance or a set of NF service instances (Step 3). In the latter case, the SCP 18 selects an NF Service instance. If possible, the SCP 18 interacts with the NRF 34 to get selection parameters such as location, capacity, etc. The SCP 18 routes the request to the selected NF service producer instance (Step 4). The SCP 18 similarly receives a response from the producer 32 (Step 5) and routes the response to the consumer 30 (Step 6). The SCP 18 may serve as a proxy for subsequent request(s) in a similar way (Step 7 and 8).

FIG. 2B shows a scenario referred to as indirect communication with delegated discovery. The consumer 30 does not do any discovery or selection in this case. Instead, the consumer 30 adds any necessary discovery and selection parameters required to find a suitable producer 32 to the service request, and sends the service request along with the parameters to the SCP 18 (Step 1). The SCP 18 uses the request address and the discovery and selection parameters in the request message to route the request to a suitable producer instance 32 (Step 2). The SCP 18 in this regard can perform discovery with an NRF 34 and obtain a discovery result. The SCP 18 similarly receives a response from the producer 32 (Step 3) and routes the response to the consumer 30 (Step 4). The SCP 18 may serve as a proxy for subsequent request(s) in a similar way (Step 5 and 6).

In both scenarios, service requests of the NF consumer 30 are not sent directly to the NF producer 32, but instead routed via one or several service communication proxies (SCP) 18. Accordingly, the consumer 30 and producer 32 in FIGS. 2A and 2B exemplifies the NFs 14, 16 in FIG. 1 that communicate indirectly via an SCP 18.

In some embodiments, the SCP 18 includes one or more of the following functionalities: Indirect Communication, delegated discovery, message forwarding and routing to destination NF/NF service, message forwarding and routing to a next hop SCP, communication security (e.g. authorization of the NF Service Consumer to access the NF Service Producer API), load balancing, monitoring, overload control, and interaction with a Unified Data Repository (UDR), to resolve the Unified Data Management (UDM) Group ID/UDR Group ID/Authentication Server Function (AUSF) Group ID/Policy Control Function (PCF) Group ID/Charging Function (CHF) Group ID/Home Subscriber Server (HSS) Group ID based on User Equipment (UE) identity, e.g., Subscription Permanent Identifier (SUPI) or Internet Protocol (IP) Multimedia Private Identity (IMPI)/IP Multimedia Public Identity (IMPU).

In some embodiments, the SCP 18 may be deployed in a distributed manner. Note that SCPs, including SCP 18, can be deployed at the Public Land Mobile Network (PLMN) level, shared-slice level, and slice-specific level.

In order to enable SCPs to route messages through several SCPs (i.e. next SCP hop discovery), an SCP may register its profile in the NRF. Alternatively, local configuration may be used.

Note that, in some embodiments, an NRF can be colocated together with the SCP 18.

In some embodiments, a Uniform Resource Identifier (URI) uniquely identifies a resource. In the 5G Core SBI APIs, when a resource URI is an absolute URI, its structure may be specified as follows:

{apiRoot}/<apiName>/<apiVersion>/<apiSpecificResourceUriPart>

"apiRoot" shall be a concatenation of the following parts:
scheme ("http" or "https")
the fixed string "://"
authority (host and optional port) as defined in IETF RFC 3986
an optional deployment-specific string (API prefix) that starts with a "/" character.
"apiName" shall define the name of the API.

"apiVersion" shall indicate the 1st Field (MAJOR) of the version of the API.

While "apiRoot", "apiName" and "apiVersion" together define the API URI of the corresponding API, each "apiSpecificResourceUriPart" defines a resource URI of the API relative to the API URI.

In some embodiments, the assertion 26 is a Client credentials assertion, e.g., as specified by 3GPP. In some embodiments, a Client credentials assertion is a JSON Web Token as described in RFC 7519 and is secured with a digital signature based on a JSON Web Signature (JWS) as described in RFC 7515. In one embodiment, where the NF 14 transmitting the message 22 is an NF Service Consumer and the NF 16 receiving the message 22 is an NF Service Producer, the Client credentials assertion shall include: (i) the NF instance ID of the NF Service Consumer (subject); (ii) a timestamp (iat) and an expiration time (exp); and (iii) the NF type of the expected audience (audience), i.e. the type "NRF", "NF service Producer", or "NRF" and "NF Service Producer". The timestamp may serve as a basis for restriction of the lifetime of the assertion.

In some embodiments, the Client credentials assertion enables an NF Service consumer to authenticate towards the receiving end point, e.g., NRF or NF Service Producer, e.g., by including the signed token in a service request. In this case, the Client credentials assertion includes the NF Service Consumer's NF Instance ID that can be checked against the certificate by the NF Service Producer.

In some embodiments, the verification of the Client credentials assertion shall be performed by the receiving node, i.e., NRF or NF Service Producer in the following way. It validates the signature of the JWS as described in RFC 7515. If validates the timestamp (iat) and/or the expiration time (exp) as specified in RFC 7519. If the receiving node is the NRF, the NRF validates the timestamp (iat) and the expiration time (exp). If the receiving node is the NF Service Producer, the NF service Producer validates the expiration time and it may validate the timestamp. It checks that the audience claim in the client credentials assertion matches its own type. It verifies that the NF instance ID in the client credentials assertion matches the NF instance ID in the public key certificate used for signing the assertion.

Figure 3:
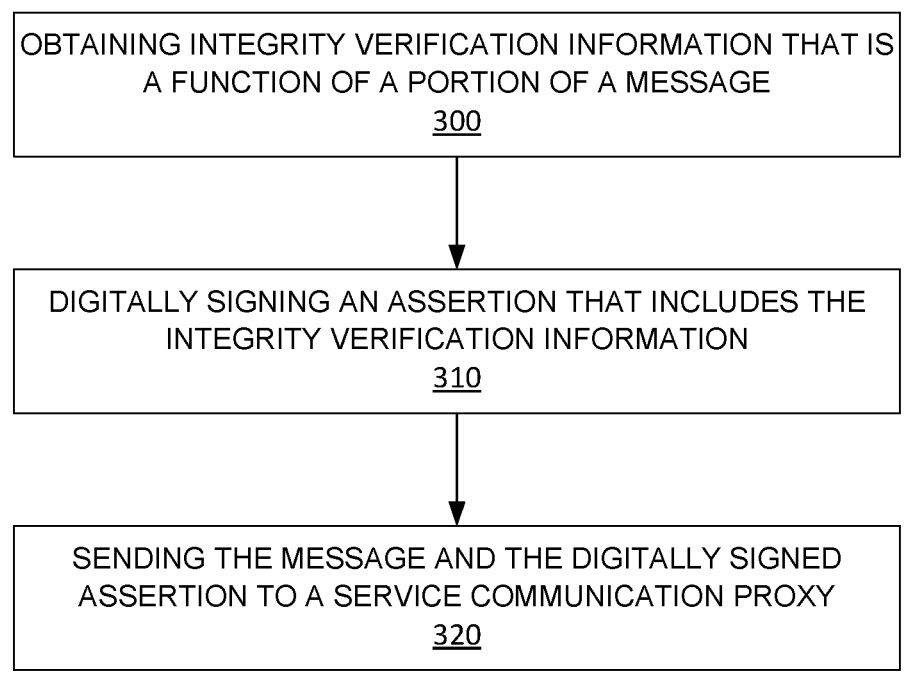
FIG. 3 is a logic flow diagram of a method performed by network equipment according to some embodiments.

In view of the above modifications and variations, FIG. 3 depicts a method performed by network equipment that implements NF 14 in a wireless communication network 10 according to some embodiments. The method comprises obtaining integrity verification information 24 that is a function of a portion 22-2 of a message 22 (Block 300). Indeed, in some embodiments, the obtained integrity verification information 24 is a function of only that portion 22-2 of the message 22. Regardless, the message 22 is either a request for a service to be consumed by NF 14 or a response to a request for a service provided by NF 14. The method as shown further comprises digitally signing an assertion 26 that includes the integrity verification information 24 (Block 310). The method may then include sending the message 22 and the digitally signed assertion 26 to a service communication proxy (SCP) 18 (Block 320).

In some embodiments, for example, the integrity verification information 24 is a hash of the portion 22-2 of the message 22. In other embodiments, the integrity verification information 24 is the portion 22-2 of the message 22 itself.

In some embodiments, the message 22 includes one or more headers and a body, and the portion 22-2 of the message 22 is the body (e.g., a JSON body).

In some embodiments, the message 22 includes a path pseudo-header that identifies a target of the message 22, and the portion 22-2 of the message 22 excludes the path pseudo-header. Alternatively or additionally, the message 22 may include a Uniform Resource Identifier, URI, that identifies a resource as a target of the message 22, and the portion 22-2 of the message 22 may exclude the URI.

In some embodiments, the assertion 26 is a JavaScript Object Notation, JSON, Web Token, and digitally signing the assertion 26 is based on a JSON Web Signature.

In some embodiments, the assertion 26 is a client credentials assertion that further includes at least one of any one or more of: an instance ID of the network function; a timestamp indicating a time at which the assertion 26 is generated; a time at which the assertion 26 expires; and a network function type of an expected audience of the assertion 26.

In some embodiments, the assertion 26 is a token.

In some embodiments, sending the message 22 and the digitally signed assertion comprises sending the message 22 and the digitally signed assertion to the service communication proxy over a secured transport layer tunnel (e.g., a Transport Layer Security, TLS, tunnel) between the network equipment and the service communication proxy 18.

In some embodiments, the digitally signed assertion is included in a header of the message 22.

In some embodiments, the message 22 is an application layer message.

Figure 4:
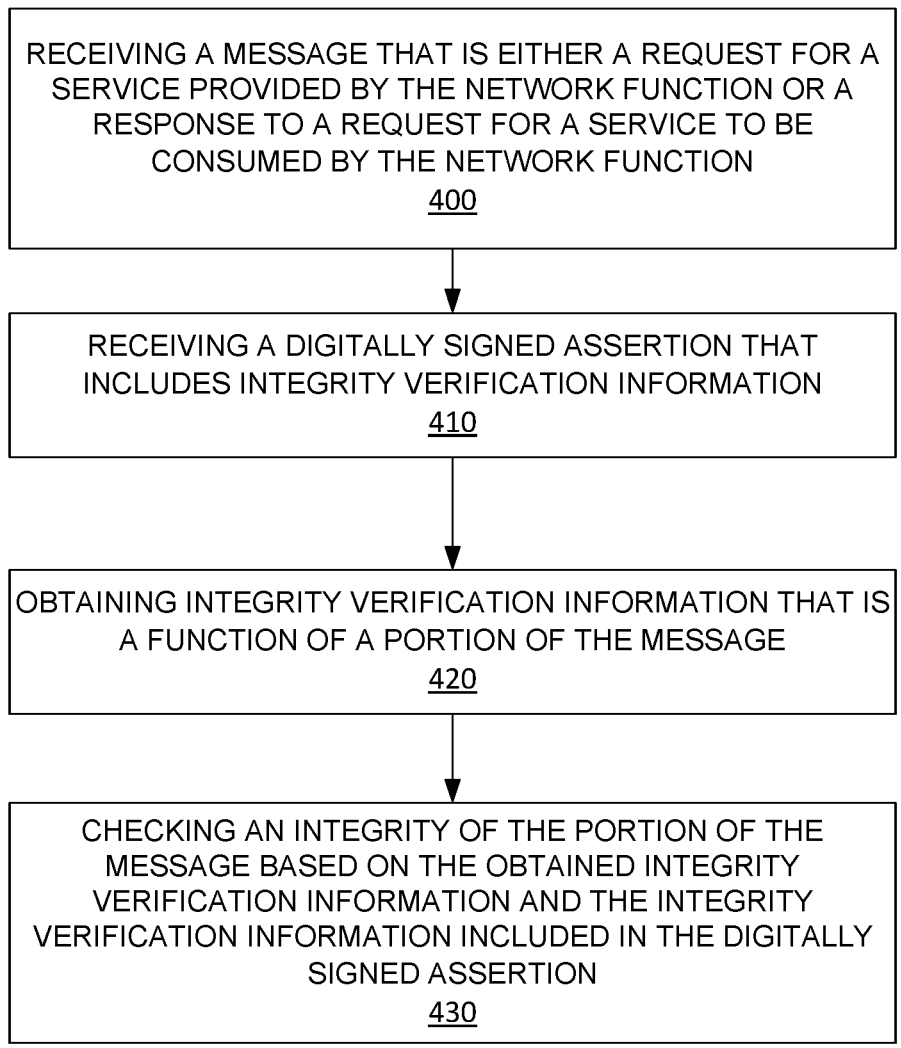
FIG. 4 is a logic flow diagram of a method performed by network equipment according to other embodiments.

FIG. 4 depicts a method performed by network equipment that implements NF 16 in a wireless communication network 10 according to other embodiments. The method comprises receiving a message 22 that is either a request for a service provided by NF 16 or a response to a request for a service to be consumed by NF 16 (Block 400). The method also comprises receiving a digitally signed assertion 26 that includes integrity verification information 24 (Block 410). The method further comprises obtaining integrity verification information that is a function of a portion 22-2 of the message 22 (Block 420). Indeed, in some embodiments, the obtained integrity verification information is a function of only that portion 22-2 of the message 22. Regardless, the method then comprises checking an integrity of the portion 22-2 of the message 22, based on the obtained integrity verification information and the integrity verification information 24 included in the digitally signed assertion 26 (Block 430).

In some embodiments, checking the integrity of the portion 22-2 of the message 22 comprises checking whether or not the obtained integrity verification information matches the integrity verification information 24 included in the digitally signed assertion 26. In this case, method further comprises verifying the integrity of the portion 22-2 of the message 22 if the obtained integrity verification information matches the integrity verification information 24 included in the digitally signed assertion 26 according to said checking. In one embodiment, for example, the method further comprises selecting, from among different possible actions, an action to perform based on whether or not the integrity of the portion 22-2 of the message 22 is verified, and performing the selected action. For instance, the different possible actions may include two or more of responding to the message 22, sending an error message 22, dropping the message 22, or refraining from responding to the message 22.

In some embodiments, the obtained integrity verification information is a hash of the portion 22-2 of the message 22. In other embodiments, the obtained integrity verification information is the portion 22-2 of the message 22 itself.

In some embodiments, the message 22 includes one or more headers and a body, and the portion 22-2 of the message 22 includes the body.

In some embodiments, the message 22 includes a path pseudo-header that identifies a target of the message 22, and the portion 22-2 of the message 22 excludes the path pseudo-header. Alternatively or additionally, the message 22 may include a Uniform Resource Identifier, URI, that identifies a resource as a target of the message 22, and the portion 22-2 of the message 22 may exclude the URI.

In some embodiments, the assertion 26 is a JavaScript Object Notation, JSON, Web Token, and digitally signing the assertion 26 is based on a JSON Web Signature.

In some embodiments, the assertion 26 is a client credentials assertion that further includes at least one of any one or more of: an instance ID of the network function; a timestamp indicating a time at which the assertion 26 is generated; a time at which the assertion 26 expires; and a network function type of an expected audience of the assertion 26.

In some embodiments, the digitally signed assertion 26 is a token.

In some embodiments, receiving the message 22 and receiving the digitally signed assertion 26 comprises receiving the message 22 and the digitally signed assertion 26 from a service communication proxy 18.

In some embodiments, receiving the message 22 and receiving the digitally signed assertion 26 comprises receiving the message 22 and the digitally signed assertion 26 over a secured transport layer tunnel (e.g., TLS tunnel) between the network equipment and a service communication proxy 18.

In some embodiments, the message 22 is an application layer message.

Embodiments herein also include corresponding apparatuses. Embodiments herein for instance include network equipment configured to perform any of the steps of any of the embodiments described above for the NF 14 or NF 16.

Embodiments also include network equipment comprising processing circuitry and power supply circuitry. The processing circuitry is configured to perform any of the steps of any of the embodiments described above for the NF 14 or NF 16. The power supply circuitry is configured to supply power to the network equipment.

Embodiments further include network equipment comprising processing circuitry. The processing circuitry is configured to perform any of the steps of any of the embodiments described above for the NF 14 or NF 16. In some embodiments, the network equipment further comprises communication circuitry.

Embodiments further include network equipment comprising processing circuitry and memory. The memory contains instructions executable by the processing circuitry whereby the network equipment is configured to perform any of the steps of any of the embodiments described above for the NF 14 or NF 16.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
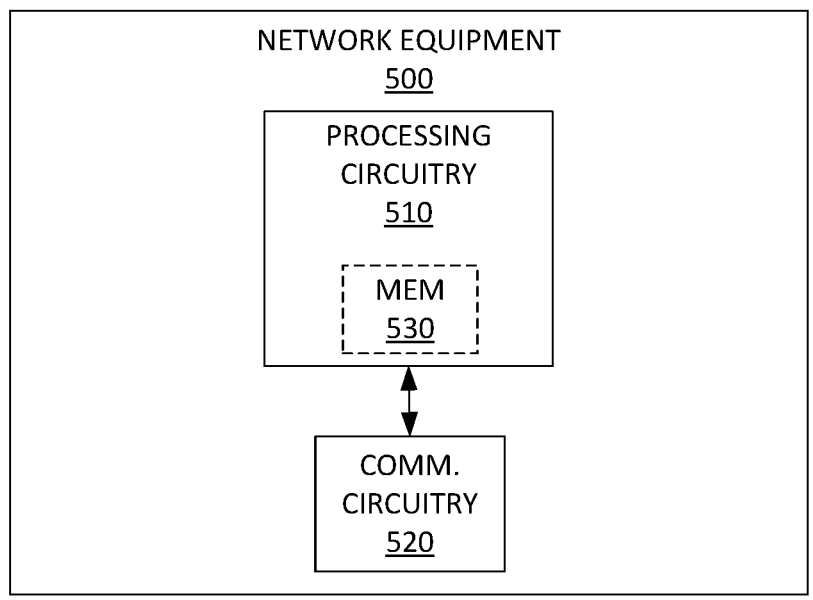
FIG. 5 is a block diagram of network equipment according to some embodiments.

FIG. 5 for example illustrates network equipment 500 as implemented in accordance with one or more embodiments. The network equipment 500 may implement NF 14 or NF 16 as shown in FIG. 1. As shown, the network equipment 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 3 and/or FIG. 4, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 6:
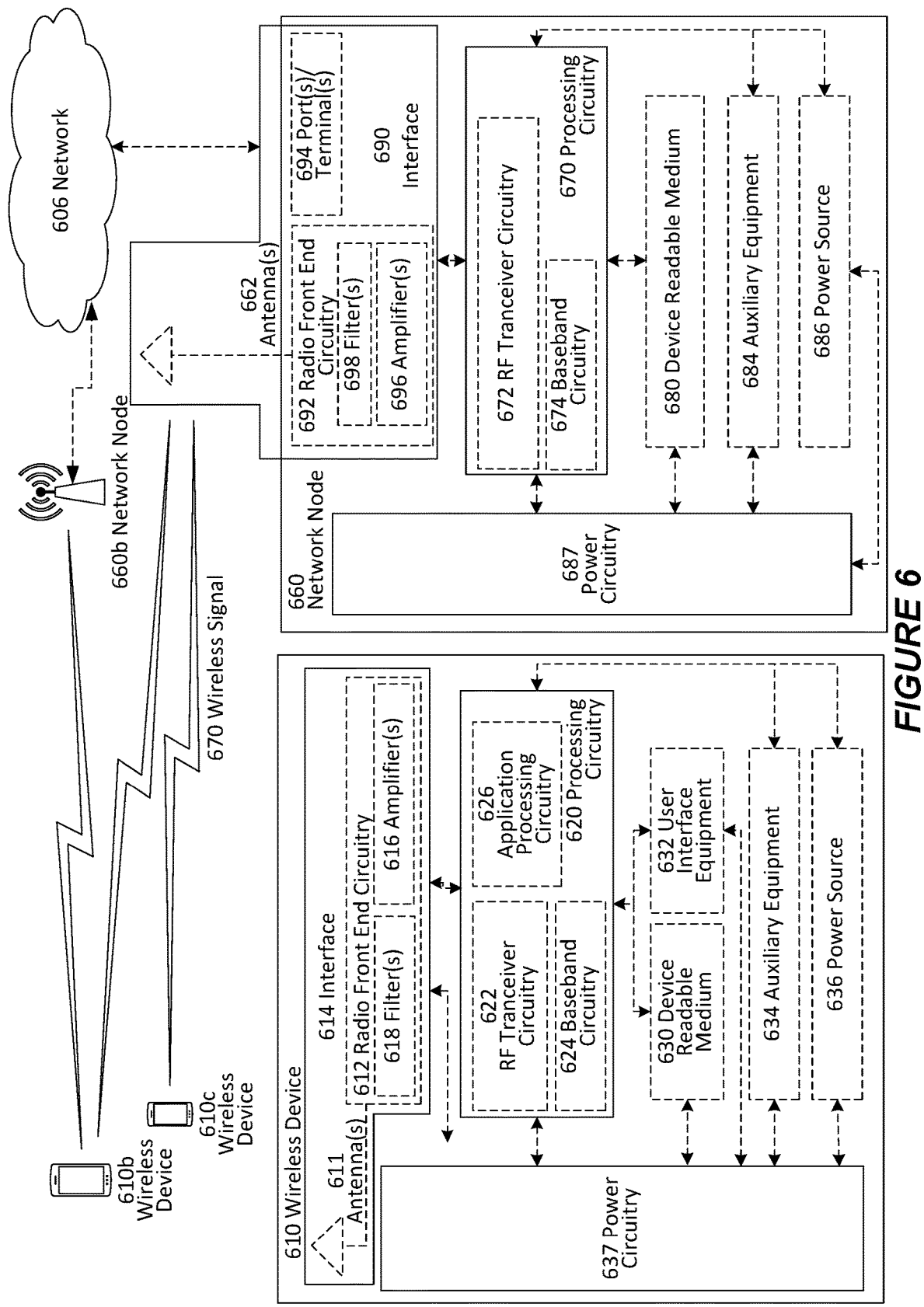
FIG. 6 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters

698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
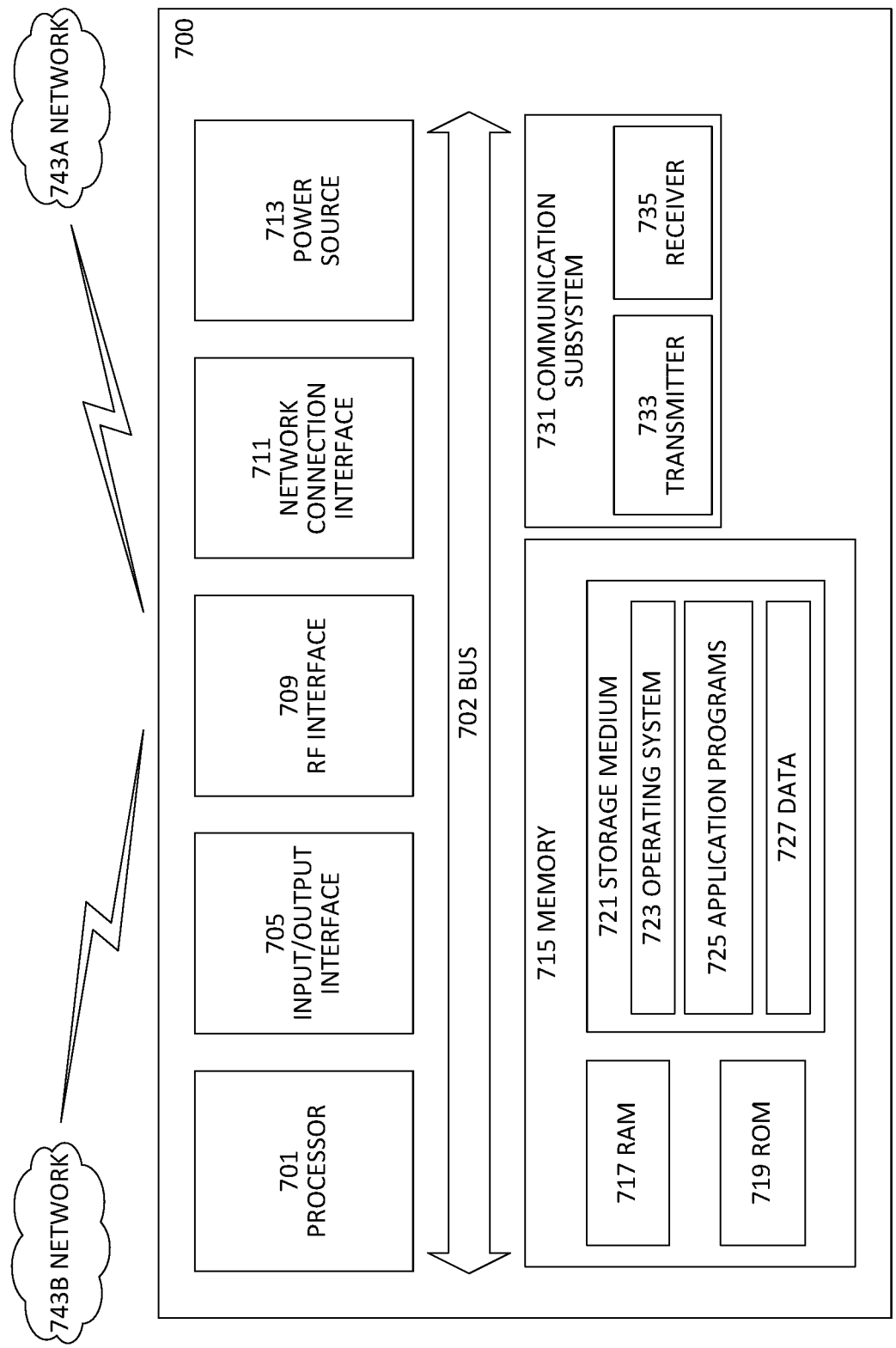
FIG. 7 is a block diagram of a user equipment according to some embodiments.
Figure 8:
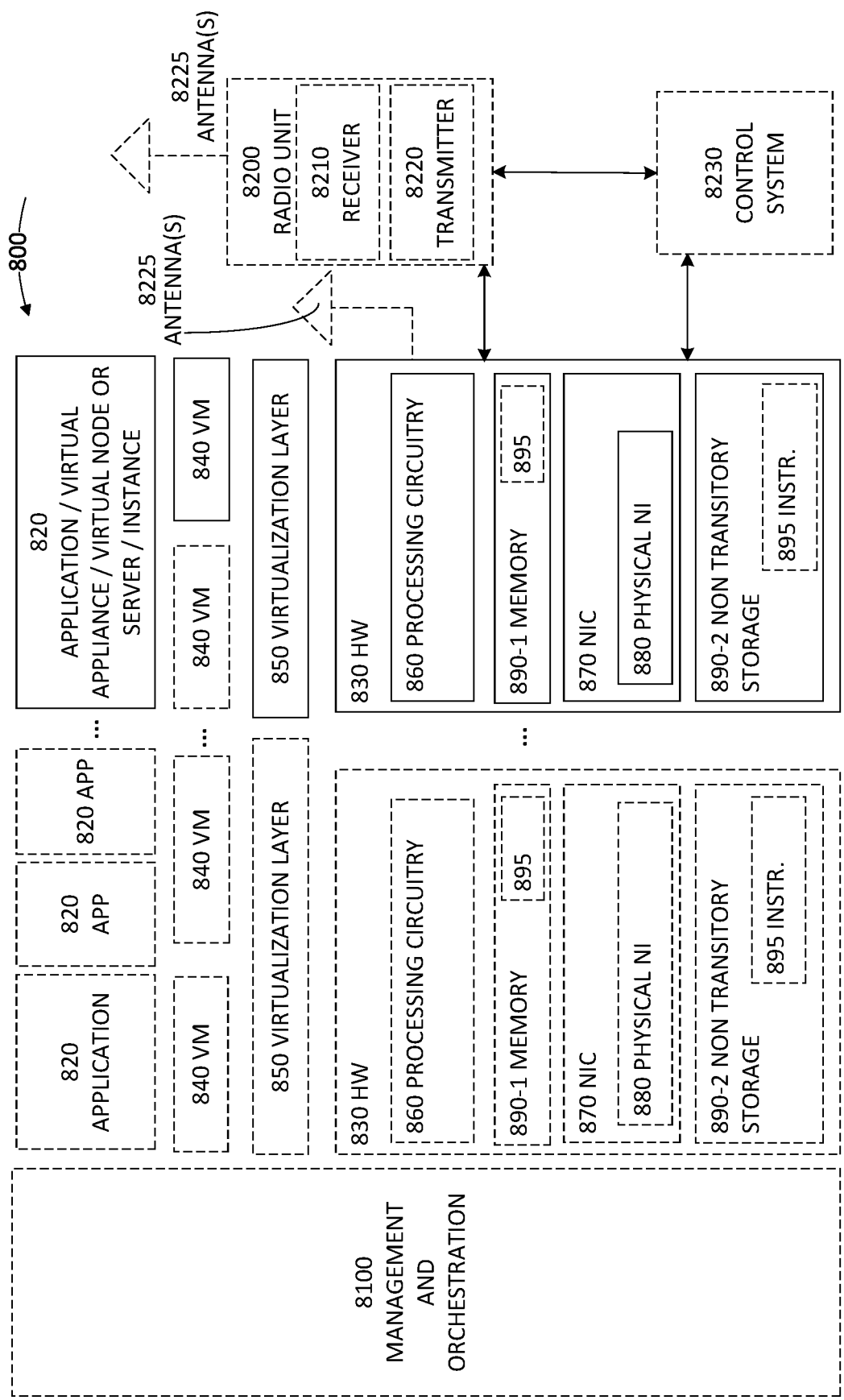
FIG. 8 is a block diagram of a virtualization environment according to some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the 3rd Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the present disclosure will come to mind to one skilled in the art having the benefit of the teachings presented in the foregoing descriptions and the associated drawings. Therefore, it is to be understood that the present disclosure not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by network equipment that implements a network function in a wireless communication network, the method comprising:
   obtaining integrity verification information that is a function of only a portion of a message, wherein the message is either a request for a service to be consumed by the network function or a response to a request for a service provided by the network function;
   digitally signing an assertion that includes the integrity verification information; and
   sending the message and the digitally signed assertion to a service communication proxy.

2. The method of claim 1, wherein the integrity verification information is a hash of the portion of the message.

3. The method of claim 1, wherein the message includes one or more headers and a body, and wherein the portion of the message includes the body.

4. The method of claim 1, wherein one or more of:
   the message includes a path pseudo-header that identifies a target of the message, and the portion of the message excludes the path pseudo-header; or
   the message includes a Uniform Resource Identifier (URI) that identifies a resource as a target of the message, and the portion of the message excludes the URI.

5. The method of claim 1, wherein the assertion is:
   a JavaScript Object Notation (JSON) Web Token, wherein said digitally signing is based on a JSON Web Signature; or
   a client credentials assertion that further includes at least one of any one or more of:
      an instance ID of the network function;
      a timestamp indicating a time at which the assertion is generated;
      a time at which the assertion expires; and
      a network function type of an expected audience of the assertion.

6. The method of claim 1, wherein said sending comprises sending the message and the digitally signed assertion to the service communication proxy over a secured transport layer tunnel between the network equipment and the service communication proxy.

7. The method of claim 1, wherein the message is an application layer message, wherein the service communication proxy is configured to perform one or more proxy functions based on a different portion of the message, and wherein the integrity verification information is not a function of the different portion of the message.

8. A method performed by network equipment that implements a network function in a wireless communication network, the method comprising:
   receiving a message that is either a request for a service provided by the network function or a response to a request for a service to be consumed by the network function;
   receiving a digitally signed assertion that includes integrity verification information;
   obtaining integrity verification information that is a function of only a portion of the message; and
   checking an integrity of the portion of the message, based on the obtained integrity verification information and the integrity verification information included in the digitally signed assertion.

9. The method of claim 8, wherein said checking comprises checking whether or not the obtained integrity verification information matches the integrity verification information included in the digitally signed assertion, and wherein the method further comprises verifying the integrity of the portion of the message if the obtained integrity verification information matches the integrity verification information included in the digitally signed assertion according to said checking.

10. The method of claim 9, further comprising:
   selecting, from among different possible actions, an action to perform based on whether or not the integrity of the portion of the message is verified, wherein the different possible actions include two or more of responding to the message, sending an error message, dropping the message, or refraining from responding to the message; and
   performing the selected action.

11. The method of claim 8, wherein the obtained integrity verification information is a hash of the portion of the message.

12. The method of claim 8, wherein the message includes one or more headers and a body, and wherein the portion of the message includes the body.

13. The method of claim 8, wherein one or more of:
   the message includes a path pseudo-header that identifies a target of the message, and the portion of the message excludes the path pseudo-header; or
   the message includes a Uniform Resource Identifier (URI) that identifies a resource as a target of the message, and the portion of the message excludes the URI.

14. The method of claim 8, wherein the digitally signed assertion is:
   a JavaScript Object Notation (JSON) Web Token, wherein the digitally signed assertion is based on a JSON Web Signature; or
   a client credentials assertion that further includes at least one of any one or more of:
      an instance ID of the network function;
      a timestamp indicating a time at which the assertion is generated;
      a time at which the assertion expires; and
      a network function type of an expected audience of the assertion.

15. The method of claim 8, wherein receiving the message and receiving the digitally signed assertion comprises receiving the message and the digitally signed assertion over a secured transport layer tunnel between the network equipment and a service communication proxy.

16. The method of claim 15, wherein the service communication proxy is configured to perform one or more proxy functions based on a different portion of the message, wherein the obtained integrity verification information is not a function of the different portion of the message, and wherein the message is an application layer message.

17. Network equipment configured to implement a network function in a wireless communication network, wherein the network equipment comprises:
   communication circuitry; and
   processing circuitry configured to:
      obtain integrity verification information that is a function of only a portion of a message, wherein the message is either a request for a service to be consumed by the network function or a response to a request for a service provided by the network function;
      digitally sign an assertion that includes the integrity verification information; and
      send the message and the digitally signed assertion to a service communication proxy.

18. The network equipment of claim 17, wherein the integrity verification information is a hash of the portion of the message, wherein the message includes one or more headers and a body, and wherein the portion of the message includes the body, and wherein the processing circuitry is configured to send the message and the digitally signed assertion to the service communication proxy over a secured transport layer tunnel between the network equipment and the service communication proxy.

19. The network equipment of claim 17, wherein the message is an application layer message, wherein the service communication proxy is configured to perform one or more proxy functions based on a different portion of the message, and wherein the integrity verification information is not a function of the different portion of the message.

20. Network equipment configured to implement a network function in a wireless communication network, wherein the network equipment comprises:
   communication circuitry; and
   processing circuitry configured to:
      receive a message that is either a request for a service provided by the network function or a response to a request for a service to be consumed by the network function;
      receive a digitally signed assertion that includes integrity verification information;
      obtain integrity verification information that is a function of only a portion of the message; and
      check an integrity of the portion of the message, based on the obtained integrity verification information and the integrity verification information included in the digitally signed assertion.

* * * * *